US006711684B1

(12) United States Patent
Moroney et al.

(10) Patent No.: US 6,711,684 B1
(45) Date of Patent: Mar. 23, 2004

(54) VARIABLE SECURITY CODE DOWNLOAD FOR AN EMBEDDED PROCESSOR

(75) Inventors: Paul Moroney, Olivenhain, CA (US); Eric J. Sprunk, Carlsbad, CA (US); Adam L. Rappoport, San Diego, CA (US); Lawrence W. Tang, Del Mar, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/394,765

(22) Filed: Sep. 13, 1999

Related U.S. Application Data (60) Provisional application No. 60/140,189, filed on Jun. 18, 1999, provisional application No. 60/138,381, filed on Jun. 9, 1999, and provisional application No. 60/138,164, filed on Jun. 8, 1999.

(51) Int. Cl.[7] .............................................. G06F 12/14
(52) U.S. Cl. ....................................... 713/191; 713/194
(58) Field of Search ................................ 713/189, 191, 713/200, 194, 1

(56) References Cited

U.S. PATENT DOCUMENTS

| 5,101,121 | A |   | 3/1992  | Sourgen ................. 307/465 |
| 5,386,469 | A |   | 1/1995  | Yearsley et al. ............ 380/3 |
| 5,423,050 | A |   | 6/1995  | Taylor et al. ............ 395/575 |
| 5,434,804 | A |   | 7/1995  | Bock et al. .............. 364/579 |
| 5,448,576 | A |   | 9/1995  | Russell ................... 371/22.3 |
| 5,479,652 | A |   | 12/1995 | Dreyer et al. ......... 395/183.06 |
| 5,483,518 | A |   | 1/1996  | Whetsel .................. 370/13 |
| 5,559,889 | A |   | 9/1996  | Easter et al. ............. 380/30 |
| 5,608,881 | A |   | 3/1997  | Masumura et al. ........ 395/306 |
| 5,623,604 | A | * | 4/1997  | Russell et al. ............ 717/167 |
| 5,708,773 | A |   | 1/1998  | Jeppesen, III et al. ... 395/183.06 |
| 5,768,152 | A |   | 6/1998  | Battaline et al. ........ 364/551.01 |
| 5,799,083 | A | * | 8/1998  | Brothers et al. ........... 380/239 |
| 5,930,523 | A |   | 7/1999  | Kawasaki et al. ....... 395/800.32 |
| 5,978,902 | A |   | 11/1999 | Mann ...................... 712/227 |
| 5,983,379 | A |   | 11/1999 | Warren .................... 714/727 |
| 5,995,628 | A | * | 11/1999 | Kitaj et al. .............. 713/164 |
| 6,000,773 | A | * | 12/1999 | Murray et al. ............. 347/7 |
| 6,307,936 | B1 | * | 10/2001 | Ober et al. ................ 380/30 |
| 6,385,727 | B1 | * | 5/2002  | Cassagnol et al. ........ 713/193 |
| 6,577,734 | B1 | * | 6/2003  | Etzel et al. ............... 380/277 |

FOREIGN PATENT DOCUMENTS

| EP | 0 636 976 A1 | 7/1994 |
| EP | 0 702 239 A2 | 8/1995 |
| EP | 0 720 092 A1 | 12/1995 |
| WO | WO 94/10687  | 5/1994 |

OTHER PUBLICATIONS

Richard York et al., "Real Time Debug for System–on–Chip Devices," ARM Ltd., Cambridge, UK, Jun. 1999.
Morten Zilmer, "Non–intrusive On–chip Debug Hardware Accelerates Development for MIPS RISC Processors," *EE Times*, available at http://www.amslink.com/mipsartl.html, Mar. 30, 1999, pps. 1–6.
"MIPS EJTAG Debug Solution," 980818 Rev. 2.0.0, available at www.mips.com, Aug. 18, 1998, pp. 1–124.

* cited by examiner

*Primary Examiner*—Matthew Smithers
*Assistant Examiner*—Andrew Nalven
(74) *Attorney, Agent, or Firm*—Townsend and Townsend and Crew LLP (57) ABSTRACT

Methods and an apparatus for storing information in a processing device with flexible security are disclosed. In one embodiment, a method stores information within the processing device. The method receives a download via a first input path which includes a first breakable link and stores the download within the processing device. At some point, a key is also stored within the processing device. A ciphertext download is received via a second input path which includes a second breakable link. The ciphertext download is decrypted utilizing the key and the resulting plaintext download is stored within the processing device.

29 Claims, 6 Drawing Sheets

VARIABLE SECURITY CODE DOWNLOAD FOR AN EMBEDDED PROCESSOR

This application claims the benefit of the following provisional Application Nos. and filing dates: 60/140,189, filed Jun. 18, 1999; 60/138,381, filed Jun. 9, 1999; and 60/138,164, filed Jun. 8, 1999.

This invention related in general to data processing devices and more specifically to an apparatus and methods for allowing a processing device to utilize flexible security when receiving information downloads.

BACKGROUND INFORMATION

Processing devices often have embedded programs or firmware stored in non-volatile memory. The firmware is executed by an embedded processor to achieve the desired functionality. Conventional high security applications have relied upon read only memory (ROM) to store the firmware.

Lower security processing devices have begun storing firmware in a reprogrammable memory device. The ability to reprogram the processing device is desired because this feature allows efficient debugging of the firmware. Those skilled in the art appreciate that firmware development typically requires many revisions. Reprogrammable memory avoids the need to discard an integrated circuit which includes the memory each time the firmware revision changes. Furthermore, the ability to reprogram the memory allows firmware upgrades of the processing device in the field as new bugs are fixed or as new features are added.

Although reprogrammable memory is readily available, the ability to reprogram a high security processing device is problematic. In the cable television industry, for example, there are risks that a "cable pirate" could use the reprogrammability feature to disable any security features designed to thwart pirates by replacing the firmware. Accordingly, the reprogrammability aspect is desired, but is viewed as impractical for security reasons.

Conventional high security processing devices use an integral ROM which is masked into an application specific integrated circuit (ASIC) at the time of manufacture. Masked ROMs add little to the cost of the ASIC and cannot be changed by pirates in order to defeat the security.

However, the firmware cannot be changed once the ASIC is produced. Accordingly, all debugging of the firmware takes place on emulators and prototype ASIC devices before production ASICs are manufactured. Use of emulators is problematic because they are typically much slower than a production ASIC and they are often not exact replicas of the production ASIC. With regard to debugging with a prototype ASIC device, they are expensive and a number of prototype ASICs could be required to iteratively debug a design. It can take weeks to produce another iteration of prototype ASIC which could cause serious delay to a development program. As those skilled in the art appreciate, firmware debugging of masked ROMs is a slow and expensive proposition.

In summary, it appears desirable to develop a processing device which is reprogrammable, but not susceptible to later attack by pirates. This device should reduce the design cycle for producing the ASIC by allowing debug of the firmware after ASIC production. Furthermore, the device should allow field upgrades of the firmware as new bugs are found or as new features are added.

SUMMARY OF THE INVENTION

According to the invention, an apparatus and methods allow for a processing device to utilize flexible security when receiving information downloads. In a first embodiment, a method stores information within a processing device. The method receives a download via a first input path which includes a first breakable link and stores the download within the processing device. At some point, a key is also stored within the processing device. A ciphertext download is received via a second input path which includes a second breakable link. The ciphertext download is decrypted utilizing the key and the resulting plaintext download is stored within the processing device.

In another embodiment, a method stores information within a processing device utilizing two paths. First plaintext information is loaded through a first download path extending from outside the processing device to memory, whereafter, the first plaintext information is stored in memory. At some point, a key is stored within the processing device. To enhance security, the first download path is disabled. Ciphertext information is loaded through a second download path, whereupon the ciphertext information is decrypted with the key to produce second plaintext information.

In yet another embodiment, a processing device includes a download port, a decryption engine, a memory, a first download path, a second download path, and a mechanism for disabling the first download path. The download port interfaces with outside of the processing device. The first download path extends between the download port and memory and the second download path extends between the download port and a ciphertext input of the decryption engine. The mechanism for disabling the first download path prevents digital data from passing along that path.

DESCRIPTION OF THE SPECIFIC EMBODIMENTS

While this invention is susceptible of embodiments in many different forms, there is shown in the drawings and will herein be described in detail, a number of embodiments of the invention with the understanding that the present disclosure is to be considered as an exemplification of the principles of the invention and is not intended to limit the broad aspects of the invention to the embodiment illustrated.

In the Figures, similar components and/or features have the same reference label. Various components of the same type are distinguished by following the reference label by a dash and a second label that distinguishes among the similar components in the same figure. If only the first reference label is used in the following disclosure, the description is applicable to any one of the several similar components.

Figure 1:
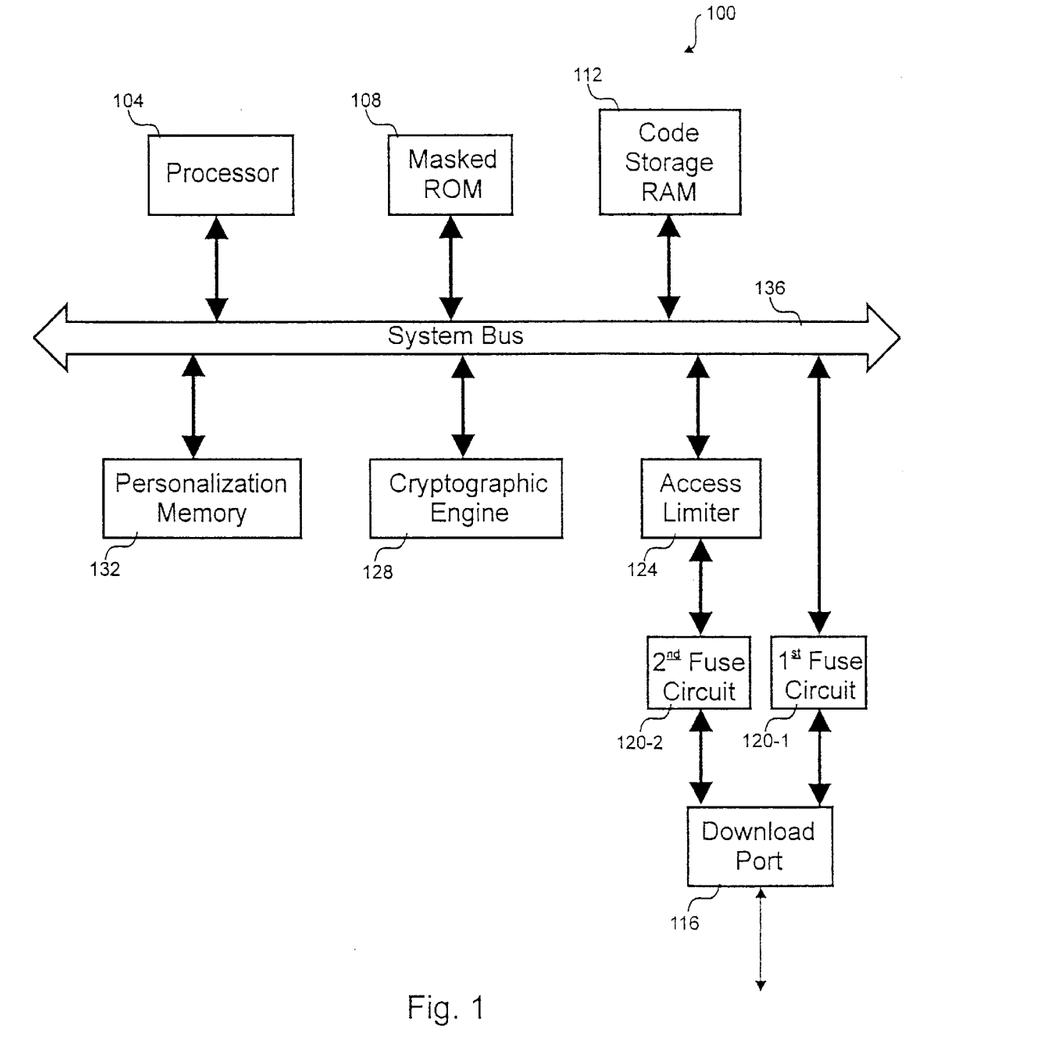
FIG. 1 is a block diagram representation of an embodiment of a processing device which has multilevel code download security.

A block diagram of one embodiment of the processing device 100 is illustrated in FIG. 1. The processing device 100 includes a processor 104, a masked ROM 108, a code storage RAM 112, a download port 116, a first fuse circuit 120-1, a second fuse circuit 120-2, an access limiter circuit 124, a crypto engine 128, and personalization memory 132 all interfaced to each other by a system bus 136. Preferably, all the blocks depicted in the figure are fabricated on the same integrated circuit or application specific integrated circuit (ASIC). Alternatively, the blocks could be integrated into a tamper proof enclosure such as a multichip module.

The processor 104 generally controls the operation of the processing device 100. Firmware or code in the masked ROM 108 and code storage RAM 112 is executed by the processor 104 to control the operation of the processing device 100. In this embodiment, the processing device 100 performs security operations related to a television set top box. Preferably, the processor is a MIPS® type embedded core, however, any number of processing cores could also be used.

The masked ROM 108 contains a portion of the firmware called the boot ROM which is the first code executed by the processor 104 while booting. The content of this memory 108 is formulated before the ASIC is produced. After fabrication of the ASIC, the contents of the masked ROM 108 cannot be altered. Accordingly, the boot ROM firmware is preferably very simple to avoid the risk of bugs which may require redesigning of the ASIC. The boot ROM verifies the contents of the code storage RAM 112, checks the state of the fuse circuits 120, loads any keys into the crypto engine 128, and passes control to any firmware in the code storage RAM 112. A universal key common to all units could be derived from the boot ROM which allows using cryptographic functions before unique keys are loaded. Generally, the boot ROM of this embodiment does not interact with any bus peripherals other than the RAM 112.

In this embodiment, the remainder of the firmware is located in the code storage RAM 112. Preferably, the code storage random access memory (RAM) is static RAM backed-up with a battery such that it is non-volatile. However, other embodiments could use an EEPROM, flash memory, magnetic core memory, or other non-volatile types of memory. After execution of the boot ROM code, the processor executes the firmware in the code storage RAM 112. Two different portions of firmware reside in the code storage RAM 112, namely the boot strap and the application code. The boot strap code is executed after the boot ROM code and checks any information stored in the personalization memory 132 to load any unique keys and performs detailed verification of the application code. After execution of the boot strap code, the application code is executed. This code performs the functions required by the processing device. In this embodiment, the application code performs security related functions associated with a television set top box such as encryption and decryption.

The download port 116 provides an interface to the processing device 100 for testing and code loading. This embodiment allows three different security levels for access to the processing device 100 from the download port 116. To access the download port 116, a probe is connected to the boundary scan interface of the ASIC. Preferably, the download port 116 is an extended JTAG interface which is coupled by an additional interface to the system bus 136 and allows mastering the bus 136. The ability to master the system bus 136 is made possible by a direct memory access (DMA) circuit within the download port 116.

The download port 116 interfaces to the system bus 136 through first and second input paths. The first path is selectively interrupted by a first fuse circuit 120-1. The first fuse circuit 120-1 includes one or more breakable links which either physically or logically breaks the conduction of digital data through the first input path. In this way, unfettered access to the system bus 136 from the download port 116 through the first path can be permanently disabled. In a similar manner to the first path, the second path is interrupted by a second fuse circuit 120-2. The second path is further interrupted by the access limiter circuit 124. Interaction with the system bus 136 is curtailed by the limiter circuit 124 such that the second path can only access an address for a cipher text input of the crypto engine 128. Accordingly, any information sent to the processing device 100 through the second path must be decrypted by the crypto engine 128 before it is useful.

The structure of the two input paths allows for multi-level security of the processing device 100. Unrestricted, partially restricted and fully restricted security levels are possible by selectively interrupting the paths through the fuse circuits 120. In the unrestricted mode, the first fuse circuit 120-1 is closed allowing the download port 116 to freely access and master the system bus 136 through the first path. This mode allows testing of the processing device 100 and downloading plaintext firmware into the code storage RAM 112. The partially restricted mode uses the second path which passes through the access limiter circuit 124. To force the partially restricted mode, the first fuse circuit 120-1 interrupts conduction of digital data through the first path. Thus, only a conduction path to the ciphertext input of the crypto engine 128 is possible in the partially restricted mode. Accordingly, any downloads must be encrypted such that the crypto engine 128 properly decrypts the download. In the fully restricted mode, the download port 116 cannot access the system bus 136 at all because the first and second paths are respectively interrupted by the first and second fuse circuits 120. Activation of both fuse circuits 120 allows nearly the same level of security possible in conventional devices which are not reprogrammable.

The fuse circuits 120 interrupt the conduction path of digital data through the fuse circuit 120. Preferably, the fuse circuits 120 are activated through a dedicated pin of the integrated circuit package for the processing device 100. In other embodiments, the processor 104 could programmably activate the fuse through a software command. Whether by programming through a pin or by a software command, the conduction path is permanently disabled once the fuse is activated. Permanent activation of the fuse circuit 120 is preferably achieved by burning away a polysilicon fuse to inhibit conduction, however, other known techniques could also be used.

Each processing device 100 is preferably personalized with unique identifiers and keys. This information is stored in personalization memory 132. The identifiers include an unit address which uniquely identifies a particular set top box. Preferably, the unit address is written in write protected memory which cannot be overwritten after being written the first time. The personalization memory 132 also includes one or more keys. Certain cryptographic algorithms require a number of keys, such as the triple Data Encryption Standard (triple-DES). Additionally, there may be a umber of cryptographic engines with each having different keys. To enhance security, some keys may be stored in encrypted form.

There are two ways to download keys into the processing device 100. In he first method, the keys are downloaded through the first path from the download port 16 directly into personalization memory 132. However, after blowing the first fuse circuit 120-1, download data passing through the download port 116 is forced through the access limiter 124 directly into the crypto engine 128 and then into code storage RAM 112. Adding new keys after the first fuse circuit 120-1 is blown, requires writing a key into the code storage RAM 112 which is then stored in the personalization memory 132 by the firmware. To write the key into the personalization memory 132, the firmware could periodically, or upon download, write the key from the code storage RAM 112 into the personalization memory 132.

The processing device 100 has the ability to encrypt and decrypt data using the crypto engine 128. In this embodiment, the crypto engine 128 uses a triple-DES algorithm implemented in hardware which uses 112 or 168 bit keys. However, any number of symmetric or asymmetric algorithms could alternatively be used or even a nonstandard algorithm could be used. The crypto engine 128 is interfaced to the system bus 136 and is mapped to the address space such that the ports for the crypto engine 128 are at different addresses. For example, the key input, ciphertext input and plaintext output have three different addresses. By manipulating the addresses, the various ports may be passed information. Although the above discussion only describes the crypto engine 128 being used to decrypt firmware, preferably the crypto engine 128 is used for a number of security related purposes in the processing device 100.

Figure 2:
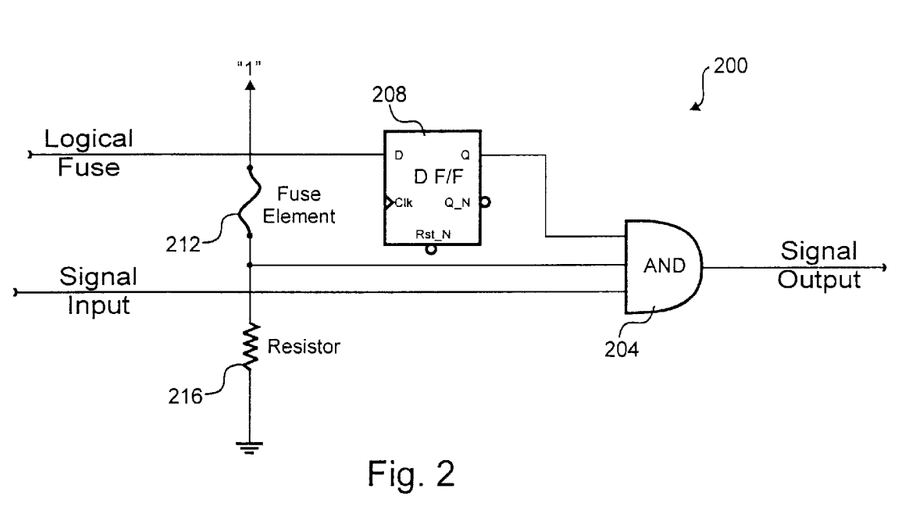
FIG. 2 is a block diagram which schematically illustrates an embodiment of a breakable link.

With reference to FIG. 2, one embodiment of a breakable link 200 is shown in block diagram form. The fuse circuit 120 may contain one or more breakable links 200. To inhibit digital data from passing through the fuse circuit 120 every line in the download path may not require a separate breakable link 200. For example, inhibiting a single bit which enables a multiline driver could inhibit all the data lines passing through the driver. Accordingly, the fuse circuit 120 may have only one breakable link.

The breakable link 200 can logically inhibit or gate the passing of data from a signal input to a signal output. Either a fuse element 212 or a programmable bit 208 is used to either permanently or temporarily gate the signal. If the fuse element 212 is blown, a resistor activates the gating mechanism 204 to permanently inhibit conduction of digital data. Accordingly, once the first and second fuse circuits 120 in the download paths are disabled by blowing the fuse elements 212, the processing device cannot receive new data from the download port 116. As discussed above, the fuse element 212 is blown from an external pin or by software.

In other embodiments, a programmable bit 208, which is addressable by the bus 136, can temporarily gate conduction of the signal. The programmable bit 208 is mapped to the address space such that any master of the system bus 136 can write to that bit. After activation of the programmable bit 208, the bit 208 can be deactivated by writing once again to re-enable the download path. In contrast, once the fuse 212 is blown, conduction through the gating mechanism 204 is forever disabled. The advantage of temporary activation is that it is reversible, however, this feature may pose obvious security risks.

Figure 3:
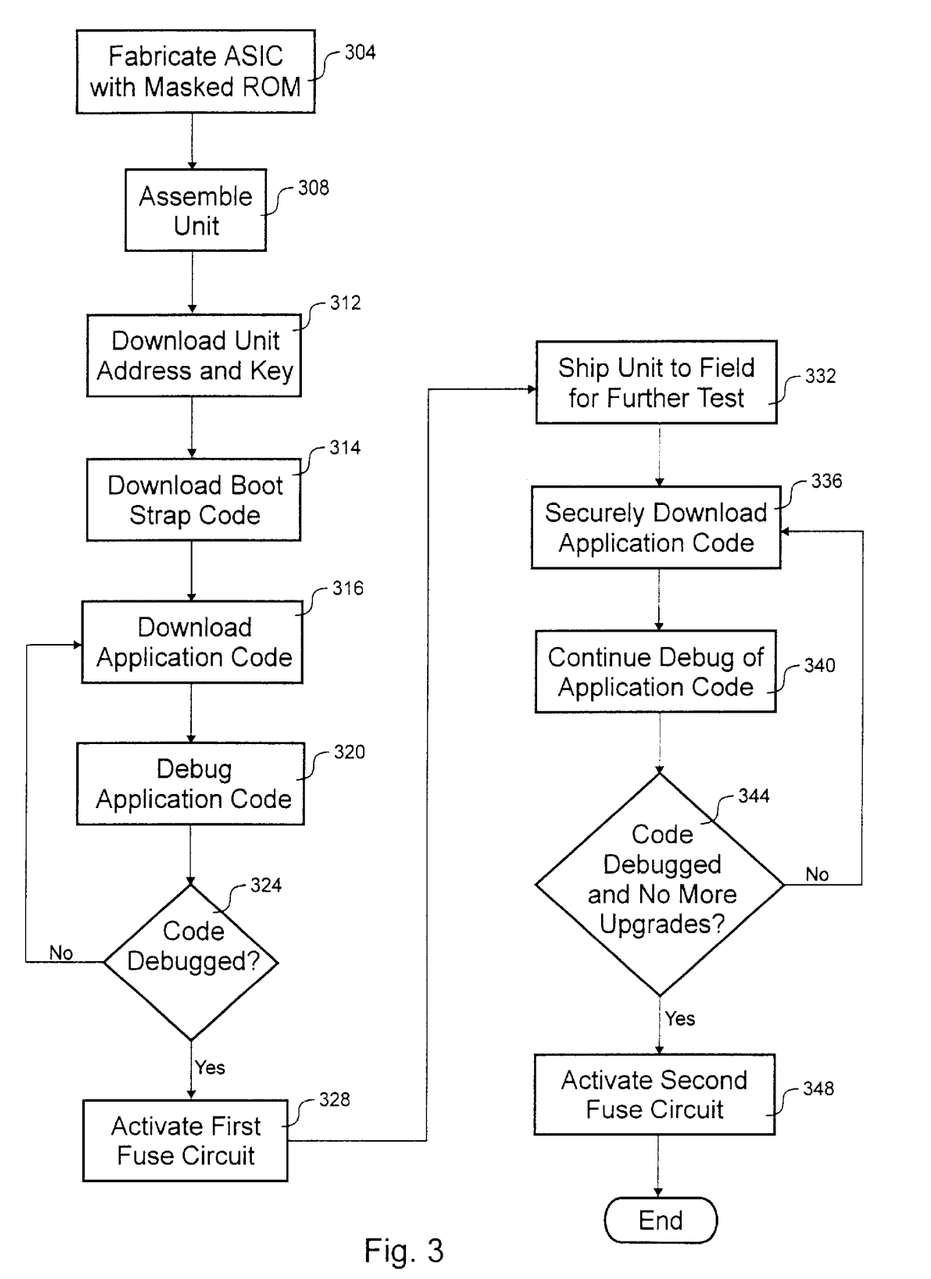
FIG. 3 is a flow diagram showing various code downloads encountered during development of the code in one embodiment.

Referring next to FIG. 3, a flow diagram of various downloads encountered during development of the code for one embodiment is shown. In step 304, the processing device ASIC is fabricated with the masked ROM 108 containing the boot ROM firmware. Before this step, the boot ROM firmware is debugged using software and hardware emulation models of the ASIC. Since emulators are typically very slow, this process can be time consuming. To limit the boot ROM debug process, this firmware is typically small and simple. As those skilled in the art can appreciate, bugs which are not caught before producing the ASIC can require an ASIC redesign to correct mistakes in the masked ROM 108. The schedule delays and mask costs associated with an ASIC redesign can have significant impact on the development effort.

The unit incorporating the ASIC is assembled in step 308. In this embodiment, the unit is a television set top box which incorporates a number of integrated circuits on a printed circuit board which is housed in an enclosure. The set top box may also include a display, a content provider interface, a television interface, and/or a computer interface.

The first firmware and personalization information is typically downloaded in the factory after assembly of the circuit board. However, other embodiments could load this information before the ASIC is soldered to the circuit board. In step 312, the unit address and key(s) are loaded into the personalization memory 132. The first download path is preferably used for loading this information because encrypting the information is not necessary when using the first download path. The unit address is unique to each unit, but the key could be generic to all units. However, if generic keys are initially loaded, unique keys are preferably loaded before fielding the unit. Key and code loading takes place by coupling a probe to the download port 116. The download port 116 interfaces with the pad ring of the ASIC through an extended JTAG (EJTAG) port which interfaces with pins of the ASIC through a boundary scan port. The *MIPS EJTAG Debug Solution*, Rev. 2.0, specification describes this interface and is available on the Internet at www.mips.com. The probe interfaces with a connector which is coupled to the boundary scan port. In step 314, the boot strap firmware is loaded into the code storage RAM 112 through the first path in the same manner used to load the unit address and key. Although not shown, the boot strap firmware could require iterative debugging.

In steps 316, 320 and 324, the application firmware is tested and debugged in an iterative manner. The first application firmware is loaded into the code storage RAM in step 316. At this point, the firmware has all its constituent parts with the boot ROM firmware, boot strap and application code present in the processing device 100. However, debugging of the application code is usually necessary and begins in step 320. A determination is made in step 324 whether the firmware is sufficiently debugged to proceed to the next phase of fielding units. If further debugging is necessary, the process loops back to step 316.

If further debugging is not warranted at this stage, preparation is made to ship the units to the field. To provide added security, the first fuse circuit 120-1 is activated to inhibit digital data from passing through the first path into the processing device 100 in step 328. Up to this point, data downloads into the processing device 100 were sent without encryption, however, downloads after this point will require encryption. As those skilled in the art can appreciate, preparing firmware encrypted in a unique key is an involved process, but, the extra security is believed necessary once the units are shipped to the public. In step 332, the units are shipped to the field for further test or deployment.

Once fielded, additional bugs may be found in field test or in actual system use or additional features may be added to provide new functionality. In step 336, new application firmware is loaded through the second path. Since the second path is routed through the crypto engine 128, the firmware must be encrypted for the key in the unit. The key necessary for encryption is determined by knowing the unique unit address. The unit address is correlated with a database to the required key. To further enhance security, the database storing the keys is heavily secured.

Any debug of problems found in field testing occurs in step 340. A determination is made in step 344 whether debugging is complete and that no additional upgrades are needed. If more debugging or upgrades are necessary or desired, the cycle continues in steps 336 and 340.

If the firmware is acceptably robust and further upgrades are not desired, the iterative revising process of the code is completed. In step 348, the second fuse circuit 120-2 is opened to inhibit coupling digital data through the second data path. At this point in the process, no data of any kind can be downloaded into the processing device 100. Loading different firmware or keys into the set top box would require replacing the ASIC. By using this multilevel security in this way, debugging of the chip is accelerated while reducing the risk of an ASIC redesign. Further, field upgrades which revise the code are possible. Additionally, after opening both fuse circuits 120, additional downloads to the ASIC are not possible such that the security is nearly equivalent to the conventional systems which store all the firmware in masked ROM.

Even if the download paths are disabled in the above embodiment, the processor 104 could modify the contents of the code storage RAM. To further enhance security in other embodiments, activation of the fuse circuit 120-2 can prevent external write access to the code storage RAM 112. Additionally, activation of the fuse circuit 120-2 could disable any internal write access to the code storage RAM 112. In this way, the code storage RAM cannot be externally or internally modified which provides security equivalent to the conventional systems which use a masked ROM for code storage.

Figure 4:
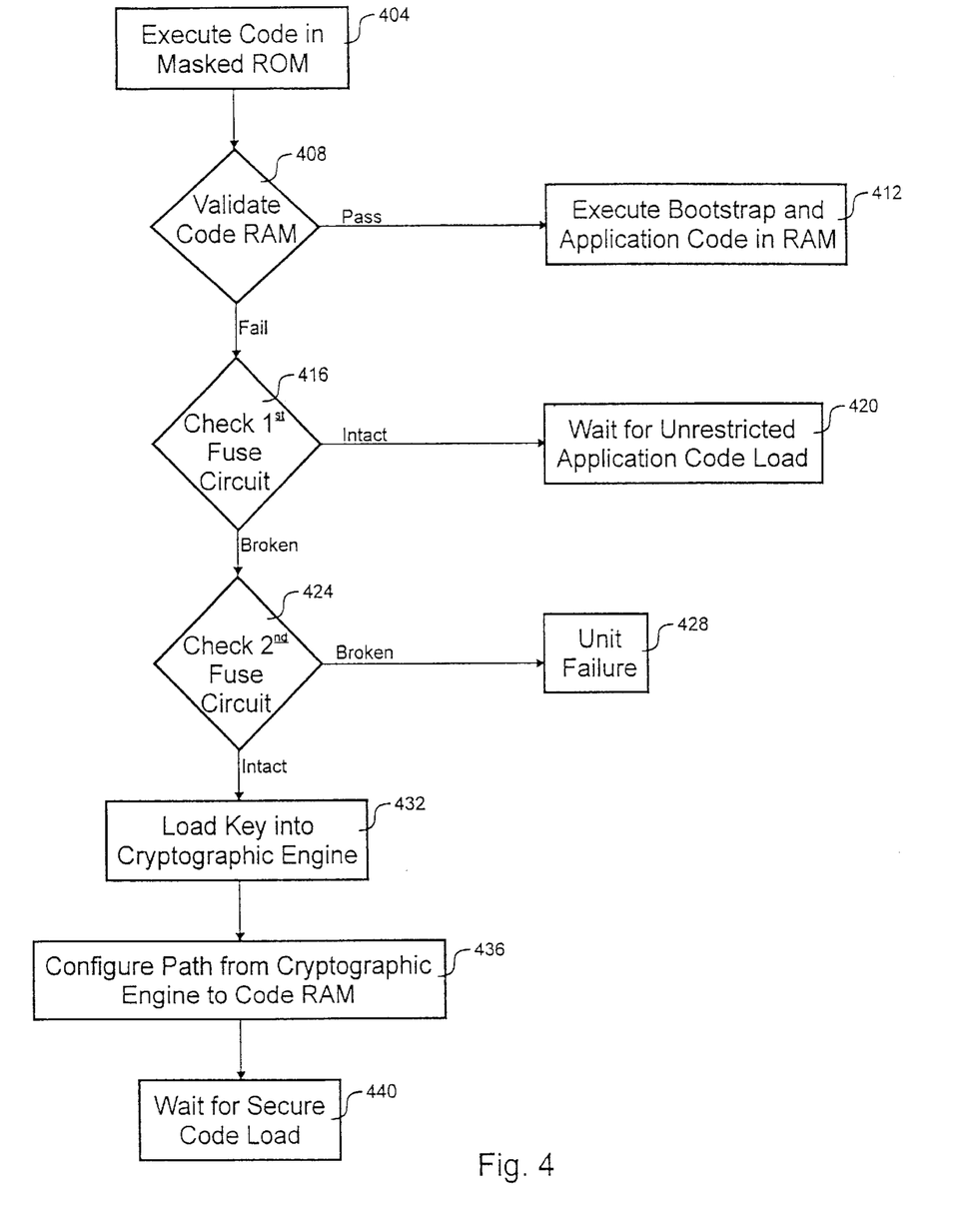
FIG. 4 is a flow diagram depicting steps encountered while booting an embodiment of the processing device.

With reference to FIG. 4, a flow diagram depicting steps encountered while booting an embodiment of the processing device is illustrated. The firmware is executed in stages starting with the boot ROM code, continuing with the boot strap code and finishing with the application code. However, other embodiments could include the functionality of the boot strap code in one of the other portions of code.

Execution by the processor 104 begins with the code stored in the masked ROM in step 404. In step 408, the boot ROM code validates the contents of the code storage RAM 112. One method for validation of the code storage RAM 112 involves calculating a checksum, cyclic redundancy check (CRC), cryptographic signature, or other security mechanism. If the check passes, the bootstrap and application code are executed by the processor in step 412. Proceeding to step 412 is the normal flow for working units in the field.

If it is determined application code is not present or is defective in step 408, the state of the first fuse circuit 120-1 is checked by the boot ROM code in step 416. If the first fuse circuit 120-1 is intact, the processor 104 waits for a download of firmware in step 420. Since the first download path is intact, any download of firmware can be done as plaintext without encryption. After the download is complete, the program counter of the processor is reset so that processing begins again in step 404.

If the first fuse circuit 120-1 is open, the second fuse circuit 120-2 is checked by the boot ROM code in step 424. In the case that the fuse circuit 120-2 is broken, processing continues to step 428. The unit at step 428 does not have valid firmware and all paths to load new firmware are broken. Accordingly, the unit is broken and the ASIC needs replacing. However, if the fuse is still intact, the processing continues to step 432 where the key is loaded from the personalization memory and into the crypto engine 128. This step enables decryption by the crypto engine 128 as data passes through the second path.

The second path from the download port 116 to the code storage RAM 112 is further enabled in step 436. Any data received from the download port 116 is funneled to the ciphertext input address of the crypto engine 126 by the access limiter circuit 124. In step 436, the plaintext output from the crypto engine 436 is directed to the code storage RAM 112 by appropriately configuring a DMA controller.

The processor 104 waits for a secure code download in step 440. Because the first fuse circuit 120-1 is broken, all downloads into the processing device 100 are funneled down the second path through the crypto engine 128 and require encryption. Once new application code is decrypted and loaded into code storage RAM, the program counter of the processor is reset to begin processing at step 404 again. In this way, the boot ROM can allow downloads of application firmware with varying levels of security.

Figure 5:
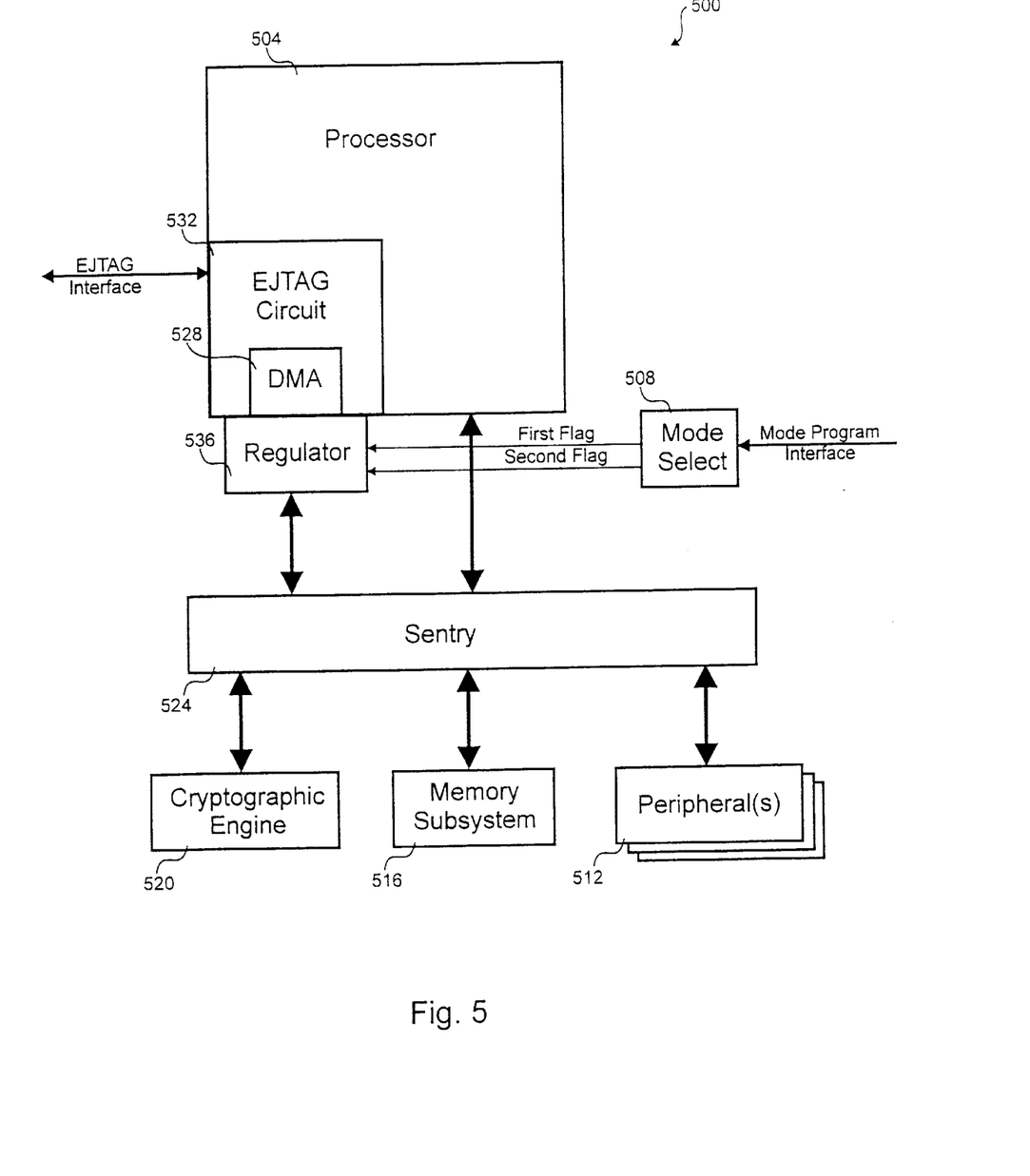
FIG. 5 is a block diagram of another embodiment of a processing device with multilevel information download security.

With reference to FIG. 5, another embodiment of a processing device 500 is schematically shown which has multilevel security for information downloads. The processing device 500 includes a processor block 504, a mode select circuit block 508, peripheral block(s) 512, a memory subsystem block 516, and a crypto engine block 520 which are all interconnected through a sentry block 524. This embodiment uses an extended JTAG (EJTAG) interface to receive the downloads. This specification is herein incorporated by reference.

The processor 504 is a general purpose microprocessor which generally manages the operation of the processing device 500. Preferably, the processor 504 is an embedded MIPS® core which includes a debug support unit (DSU) and an EJTAG circuit 532. The DSU allows probing into the processor 504 and emulating software. Communication to the DSU occurs over the EJTAG interface with the support of the EJTAG circuit 532. The EJTAG circuit 532 includes a direct memory access DMA circuit 528 which assists sending data to other blocks in the processing device 500 via the sentry 524.

Attached to the processor 504 is a regulator circuit 536 which implements some of the security features of the processing device 500 under the direction of the mode select circuit 508. The mode select circuit 508 preferably includes fuses which are blown in order to permanently set flags. However, other methods for permanently setting the flag could be used. By selectively blowing the fuses in the mode select circuit 508 a full debug access mode, an encrypted download mode and a no download mode are selected. In order to allow blowing the fuses, a mode program interface is coupled to pins on the package containing the processing device 500.

The mode select flags are passed to the regulator 536 to activate the multilevel download security. Preferably, the fuses are blown to set the flag. The regulator 536 allows full DMA access to the blocks within the processing device 500 when no flags are set. This mode is useful during the debug phase of development, but is typically not used in production units for security reasons. When the first flag is set, the regulator 536 forces any incoming download information to the crypto engine 520, such that addresses are ignored and are replaced by the address of the ciphertext input port of the crypto engine 520. In this mode all downloaded information must be encrypted for the key in the processing device 500 to properly produce plaintext download information. When the second flag is set, all access to other blocks in the processing device is disabled. This mode effectively disables all ability to download information into the processing device in order to provide additional security.

Interconnections between blocks in the processing device 500 are regulated by the sentry 524. Included in the sentry 524 and used for some transfers are a DMA circuit and crossbar switch. When transfers of information between blocks are desired, the sentry 524 checks if the blocks and datapaths between them are busy, looks for out of range addresses and handles timeouts. For example, when transferring information from the crypto engine 520 to the memory subsystem 516, the sentry configures the DMA circuit to pass information directly to the memory subsystem 516 without intervention from the processor 504. The crossbar switch configures the path between the crypto engine 520 and memory subsystem 516 to allow this transfer.

The crypto engine 520 processes all ciphertext information downloads from the EJTAG interface. If the first flag is not set, a destination address of the information download is selectable. Alternatively, if the first flag is set, information downloads are forced to the ciphertext input of the crypto engine 520 regardless of the desired destination. During a download with the first flag set, a path from a plaintext output of the crypto engine 520 to the memory subsystem 516 is configured to load the decrypted information into memory. Preferably, the crypto engine 520 uses a triple Data Encryption Standard (triple-DES) algorithm, but any cryptographic algorithm could be used.

The memory subsystem 516 includes different memory blocks. In this embodiment, the subsystem 516 includes a masked ROM, personalization memory and code storage RAM. Typically, information downloads are sent to the code storage RAM in order to load new firmware into the processing device 500.

Other peripherals 512 are connected to the sentry 524 as part of the implementation of the processing device 500. For example, a set top box processing device could include a video decoder as a peripheral 512.

Figure 6:
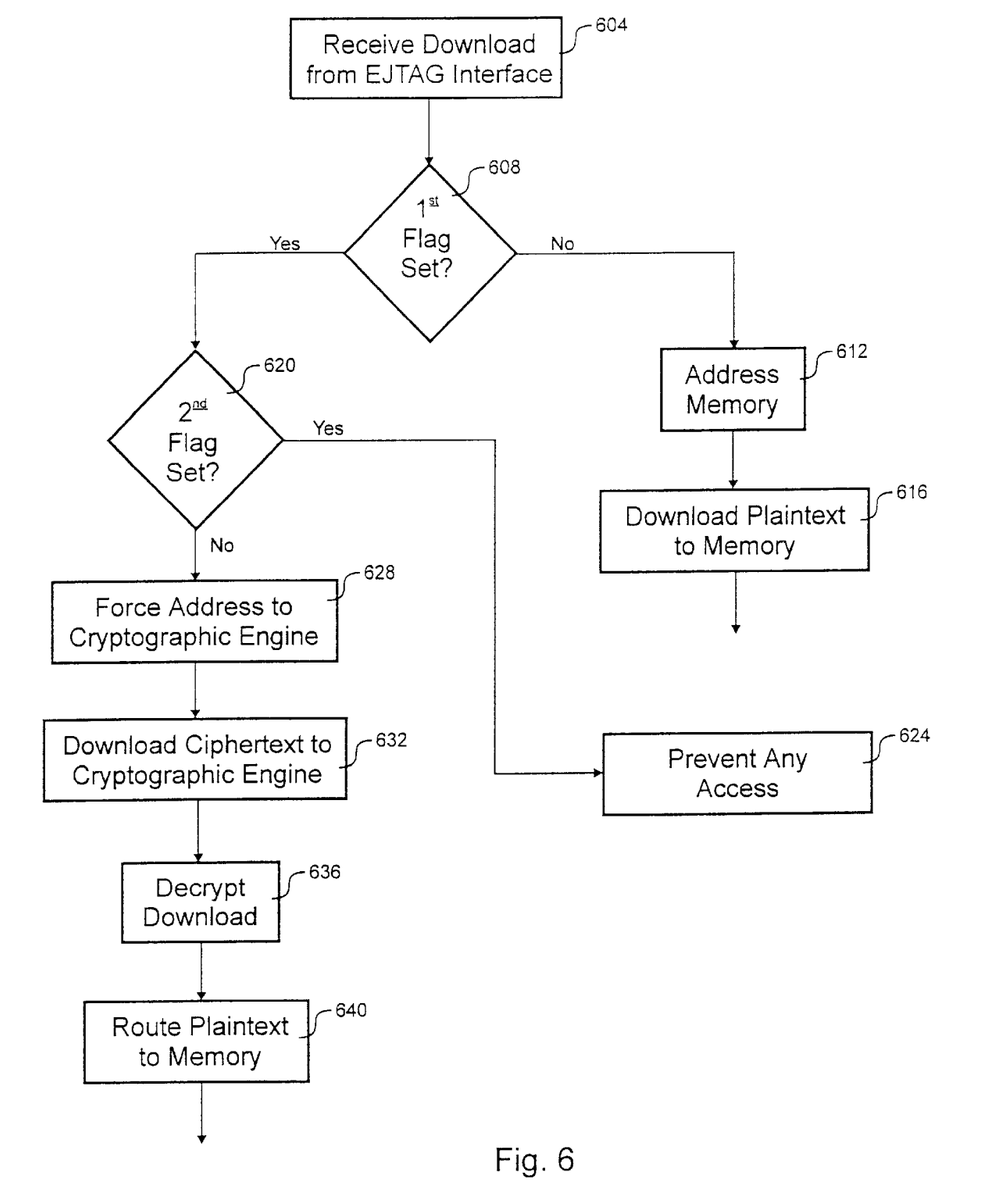
FIG. 6 is a flow diagram showing a process for downloading information to the processing device.

Referring next to FIG. 6, a flow diagram illustrates a process for downloading information to a processing device. This diagram demonstrates operation in the full debug access mode, encrypted download mode and no download mode.

The process begins in step 604 where an information download is received from the EJTAG interface. In step 608, a first determination is made whether the first flag from the mode select block 508 is set. If the flag is not set, full debug access is allowed. In this mode any block in the processing device may be addressed by the DMA circuit 528 in the EJTAG circuit 532. In step 612, the memory is addressed, and in step 616, the plaintext information is downloaded into memory. To enable this transfer, the crossbar switch in the sentry 524 connects the EJTAG interface to the memory.

If it is determined the first flag is set in step 608, processing continues to step 620. The state of the second flag from the mode select block 508 is checked in step 620. If the second flag is set, all access to the processing device 500 through the download interface is prohibited in step 624. However, if the second flag is not set, ciphertext information may be downloaded into the processing device 500. In step 628, the regulator 536 forces the address of any incoming information to the ciphertext input of the crypto engine 520. The DMA circuit 528 in the EJTAG circuit 532 passes any downloaded information through the crossbar switch in the sentry 524 to the ciphertext input of the crypto engine 520 in step 632. After the path to the crypto engine 520 is configured, the ciphertext download is decrypted in step 636 as it is received. The resulting plaintext is passed from the plaintext output of the crypto engine 520 to the memory subsystem 516. The DMA circuit and crossbar switch in the sentry 524 are configured for this purpose in step 640. The resulting plaintext is then passed to the memory subsystem 516. By use of this process, downloading information with multilevel security is possible.

In light of the above description, a number of advantages of the present invention are readily apparent. Multiple level security is possible such that one can achieve the security of a masked ROM and the ease of debugging of a device without security. In this way, the debugging of the chip is accelerated while reducing the risk of an ASIC redesign. Additionally, the security level is nearly equivalent to conventional systems which store all the firmware in masked ROM.

A number of variations and modifications of the invention can also be used. Although the above embodiments use hardware to perform decryption, other embodiments could use software algorithms executed on a processor to perform decryption. Preferably, the software algorithm would be permanently embedded in the masked ROM to enhance security. In relation to FIG. 3, the second fuse circuit was activated in the field, however, activation could occur in the factory if the firmware were sufficiently debugged and updates were not desired. FIG. 2 demonstrated that the breakable links could use a fuse to gate the signal. Other embodiments could use a fuse in the signal path to break all electrical coupling. Although the preceding discussion relates to having the processing device on a single integrated circuit or package, other embodiments could locate the functional blocks in any number of separate packages.

The foregoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled in the art to utilize the invention in such best mode or other embodiments, with the various modifications that may be required by the particular application or use of the invention. It is intended that the appended claims be construed to include alternative embodiments to the extent permitted by the prior art.

What is claimed is:

1. A method for storing information within a processing device, the method comprising steps of:
   receiving a download via a first input path which includes a first breakable link;
   storing the download within the processing device;
   storing a key within the processing device;
   receiving a ciphertext download via a second input path which includes a second breakable link;
   decrypting the ciphertext download utilizing the key; and
   storing a plaintext download related to the ciphertext download within the processing device, wherein at least one of the first and second breakable links can only be activated one time when functioning properly.

2. The method as set forth in claim 1, further comprising a step of disabling coupling of digital signals through the first breakable link to disable the first input path.

3. The method as set forth in claim 1, further comprising a step of disabling coupling of digital signals through the second breakable link to disable the second input path.

4. The method as set forth in claim 3, wherein the disabling step further comprises permanently associating the plaintext download with the processing device.

5. The method as set forth in claim 1, wherein the step of storing the download further comprises storing firmware in memory within the processing device.

6. The method as set forth in claim 1, wherein the step of storing the plaintext download further comprises storing firmware in memory within the processing device.

7. The method as set forth in claim 1, wherein the first and second input paths are the sole download paths into the processing device.

8. The method as set forth in claim 1, wherein the second input path solely couples a download port to a ciphertext input of a cryptographic engine.

9. The method as set forth in claim 1, wherein the step of storing a key comprises programming the key into a masked ROM.

10. The method as set forth in claim 1, wherein the decrypting step comprises steps of:
coupling a download port to a memory within the processing device solely through a decryption engine;
loading the key into the decryption engine; and
decrypting the ciphertext download utilizing the decryption engine in response to the step of receiving a ciphertext download.

11. The method as set forth in claim 1, wherein the step of storing a plaintext download comprises steps of:
buffering the plaintext download within the processing device;
validating the plaintext download utilizing the download; and
replacing the download in the memory with the plaintext download in response to the step of validating the plaintext download.

12. The method as set forth in claim 11, further comprising a step of transferring control of the processing device to the plaintext download.

13. The method as set forth in claim 1, wherein the step of storing a key comprises a step of storing the key in memory within the processing device in encrypted form.

14. The method as set forth in claim 1, further comprising a step of receiving the key via the first input path.

15. A method for storing information within a processing device, the method comprising steps of:
loading first plaintext information through a first download path extending from outside the processing device to memory;
storing the first plaintext information in memory;
storing a key within the processing device;
disabling the first download path in a manner that is irreversible under normal operation;
loading ciphertext information through a second download path;
decrypting the ciphertext information with the key to produce second plaintext information; and
storing the second plaintext information within the processing device.

16. The method as set forth in claim 15, further comprising the steps of:
validating the first plaintext information; and
validating the second plaintext information.

17. The method as set forth in claim 15, wherein the step of loading ciphertext information comprises a step of loading a replacement key embedded in the ciphertext information, the method further comprising steps of:
executing the second plaintext information; and
storing the replacement key within the processing device.

18. The method as set forth in claim 15, wherein the disabling step comprises permanently breaking electrical conduction through the first download path.

19. The method as set forth in claim 15, further comprising a step of disabling the second download path.

20. The method as set forth in claim 15, wherein the step of storing a key comprises storing a key for a cryptographic engine through the first download path.

21. The method as set forth in claim 15, wherein the step of storing a key comprises storing a key in a memory which cannot be altered after storage.

22. A processing device, comprising:
a download port which interfaces to outside of the processing device;
a decryption engine having a ciphertext input;
a memory;
a first download path between the download port and memory;
means for disabling the first download path, wherein the means for disabling is irreversible under normal operation of the processing device; and
a second download path between the download port and the ciphertext input.

23. The processing device as set forth in claim 22, further comprising means for disabling the second download path.

24. The processing device as set forth in claim 22, wherein the second download path continues between a plaintext output of the decryption engine and memory.

25. The processing device as set forth in claim 22, wherein at least the memory, first download path, second download path, and ciphertext input are located in the same chip package.

26. The processing device as set forth in claim 22, wherein the memory includes at least two of read-only memory, electrically erasable programmable read-only memory, random access memory, and flash memory.

27. The processing device as set forth in claim 26, wherein the random access memory is, at least partially, powered by a source other than a main power supply.

28. The processing device as set forth in claim 22, wherein the memory is at least partially non-volatile and at least partially rewritable.

29. The processing device as set forth in claim 22, further comprising means for disabling all write access to the memory.

* * * * *